March 28, 1967     K. B. KAISER     3,311,023
CUTTER SHANK TIGHTENER
Filed Nov. 12, 1964
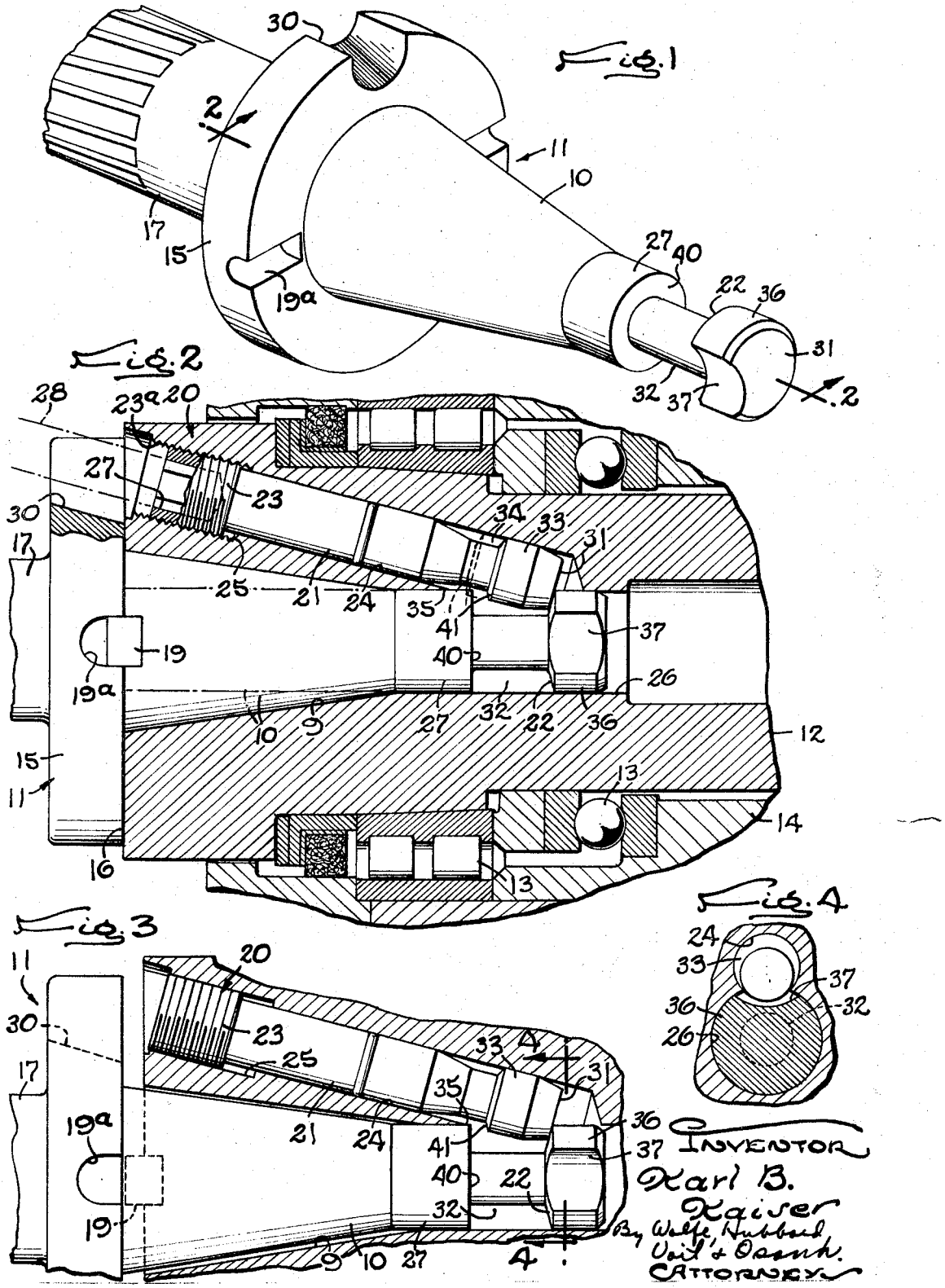

United States Patent Office 3,311,023
Patented Mar. 28, 1967

3,311,023
CUTTER SHANK TIGHTENER
Karl B. Kaiser, Rockford, Ill., assignor to The Ingersoll Milling Machine Company, Rockford, Ill., a corporation of Illinois
Filed Nov. 12, 1964, Ser. No. 410,425
6 Claims. (Cl. 90—11)

This invention relates to a tool holder having a shank received in the recessed end of a driving spindle and has particular reference to a mechanism for drawing the shank into and releasably holding the same in the spindle recess.

The primary object is to provide a tool holder of the above character in which tightening and release of the shank is produced by means carried by the spindle and accessible at the outer and recessed end thereof, the tightening and releasing means being simpler in construction and more effective in service use than prior arrangements of the same general type.

A more detailed object is to effect the tightening through the medium of a push rod extending along and mounted in the spindle outside of the shank recess and adapted to be compressed against an outwardly facing shoulder defined by an annular groove on the inner end of the tool shank.

Another object is to utilize the motion of the push rod and the opposed shoulders formed by the groove not only to pull the shank inwardly but also to push it outwardly when the shank is to be removed from the spindle.

The invention also resides in the novel and simple construction of the tool shank which permits the desired push rod action and which permits more convenient removal of the shank from the spindle.

Other objects and advantages of the invention will become apparent from the following detailed description taken in connection with the accompanying drawings, in which FIGURE 1 is a fragmentary perspective view of a tool holder adapted for use in accordance with the present invention.

FIG. 2 is a fragmentary diametrical section of the tool holder and spindle assembly, the section being taken on the line 2—2 of FIG. 1.

FIG. 3 is a view similar to FIG. 2 showing a different position of the parts.

FIG. 4 is a fragmentary section taken along the line 4—4 of FIG. 3 but showing a different position of one part.

The present invention is intended for use in drawing the shank 10 of a tool holder 11 into a recess 9 of complemental form in the outer exposed end of a spindle 12 journaled in bearings 13 which are supported in the head 14 of a machine tool. While the invention is applicable equally well to cutters having cylindrical shanks, it is shown herein applied to a conventional tapered shank adapted to fit in the socket 9 which is of complemental shape. The inward pull on the shank may draw the shank into and clamp it firmly in the socket of the spindle or the pull may be exerted on a flange 15 integral with the outer end of the shank and clamped against the outer end 16 of the spindle. The flange is drivingly coupled by keys 19 in the spindle end seated in radial slots 19a in the flange and spindle end. One or more cutting teeth may be formed on or secured to a body 17 which projects axially and outwardly from the flange 15.

In accordance with the present invention, a force for drawing the shank 10 inwardly is derived by the actuation of means indicated generally at 20 and transmitted through the medium of a push rod 21 to a radial shoulder 22 formed by an annular groove 32 on the inner end of the shank beyond the taper and facing axially and outwardly along the spindle. Preferably, the actuating means comprises mating screw elements 23, 23a, one of which is an external thread around the outer end of the push rod which is disposed in a hole 24 within the spindle and extends inwardly along but converges toward the spindle axis from an open recess 25 at the end 16 of the spindle and near the periphery thereof. The remaining length of the hole is sized to provide a bearing for free turning of the rod and also guide the same for back and forth sliding. At its inner end, the hole intersects a substantial length of the cylindrical inner end portion 26 of the shank recess into which a cylindrical extension 27 of the shank is disposed when the shank is substantially seated in the spindle recess.

The other screw element 23a of the push rod actuator 20 comprises an internal thread in the counter-bored outer end 25 of the hole 24. The end of the screw 23a is spaced within the end 16 of the spindle and preferably is formed with a recess 27 to receive the end of a wrench or driving tool shown in phantom at 28 by which the screw and push rod may be turned in opposite directions to advance or retract the rod. Through a peripheral notch 30 in the flange 15, the recess 25 is exposed for insertion of the tool when the flange is angularly positioned relative to the spindle with the keys 19 alined with the flange slots 19a (see FIG. 2).

The shoulder 22 is coned somewhat to provide a substantial area of abutment with the inner end 31 of the push rod 21. As pointed out above, the shoulder 22 comprises the inner end wall of the groove 32 which is formed in the extension 27 of the shank 10 and which has an axial width substantially greater than that of a cylindrical head 33 formed by the inner end portion of the push rod beyond a peripheral groove 34 around the latter. The latter groove is of substantial width and overlaps the outer point 35 of intersection of the hole 24 and the shank recess 26. Because of this and by virtue of the extension of the rod diagonally of the spindle, an arcuate side portion of the head 33 on the inner end of the push rod will intersect and be disposed in one side of the groove 32 for abutment with the shoulder 22 in different endwise positions of the shank and push rod (see FIGS. 2 and 3).

The shoulder 22 is on the outer end of a head 36 at the inner end of the shank which head is formed with an outwardly opening notch 37 wider and deeper than the area of intersection of the rod head 33 and the groove 32. Thus, when the notch is alined radially with the rod head 33 as shown in FIG. 4, the head 36 will pass the head 33 during insertion of the shank into the spindle or during withdrawal of the shank. Such turning of the shank relative to the spindle when the flange, after proper retraction of the push rod, is drawn outwardly from the spindle end as shown in FIG. 3 far enough to disengage the flange from the keys 19a. If desired, additional notches 37 may be provided in the shank head to allow the same to pass the clamping head in more than one angular position of the shank. With this arrangement, the shank may be removed from the spindle without having to withdraw the push rod as far as otherwise would be necessary in the absence of the notch 37.

In another of its aspects, the invention contemplates utilizing the rod 21 when pulled outwardly along the hole 24 to exert on the shank a force for pushing the latter axially and outwardly along the spindle thus freeing the tool holder for easy withdrawal. This is accomplished by forming the groove 34 around the inner end portion of the push rod with the groove overlapping the outer side wall 40 of the shank groove 32 and having a wall 41 opposing and axially spaced from the wall 40 in the seated position of the shank (FIG. 2). The wall 41 is thus adapted for abutment with the wall 40 upon retraction of the push rod from the seated position of the shank as a result of backing off the screw 23. Then, as the retraction of the rod 21 is continued, an outwardly directed force is exerted on the shank to break the same loose from the taper 9 and shift the shank outwardly as the retraction of the shoulder 41 is continued.

To mount the cutter in the spindle, the shank 10 is inserted in the recess 9 with the notch 37 in the inner end facing upwardly as shown in FIG. 4 so as to permit the inner portion 36 of the shank to pass the head 33 of the rod 21 which is retracted outwardly somewhat as shown in FIG. 3 from its final tightening position shown in FIG. 2. After the shank end 36 has moved past the rod head 33, the shank is turned relative to the spindle to aline the key slots with the keys 19 (FIG. 3) bringing the notch 30 in the flange 15 into registry with the spindle recess 25 so as to permit insertion of a tool 28 into the screw socket 27, the notch 37 thus being turned out of alinement with the rod end 31. The screw is then turned in a direction to advance the rod 21, thus first bringing the rod end 31 into abutment with the shoulder 22 and then forcing the same inwardly to draw the shank tightly into the spindle. The taper of the shank thus becomes fully seated in the spindle recess with the flange 15 clamped against the end of the spindle.

To release and remove the shank from the spindle, a tool 28 is inserted in the socket 27 and turned in a direction to retract the rod. The shoulder 41 on the rod is thus brought into abutment with the wall 40 on the shank and, upon continued turning of the rod, the shank is forced outwardly relative to the spindle as indicated by the positions of these parts shown in phantom in FIG. 2. The shank is thus freed from its tapered socket and the keys 19 and may be turned to again face the notch 37 upwardly thus permitting the shank end 36 to pass the rod head 33 as the shank is pulled outwardly relative to the spindle.

To utilize the invention for clamping a cutter having a cylindrical shank to a spindle having a correspondingly shaped socket as indicated by the dot-dash lines in FIG. 2, the inner end of the shank is formed as described above with the head 37, the groove 32, and the cylindrical portion 27 disposed in the same relation as before with respect to the bore 24 and screw 21. As before, the screw 21 is advanced inwardly to draw the shank inwardly and clamp the flange 11 and the cutter against the end of the spindle. Then, upon reverse turning and retraction of the screw, the shank is forced outwardly thus releasing the cutter for easy removal from the spindle.

It will be apparent from the foregoing that the pushing of the cutter shank inwardly along the spindle, clamping of the latter securely therein, and release of the shank are made possible by the novel construction of the inner end portion of the cutter shank. The latter is formed with the groove 32 whose opposite walls 22 and 40 form the shoulders for receiving the inward pushing and outward retracting forces but also with the notch 37 which, when turned to a position of registry with the head 33 of the push rod 21 as shown in FIG. 4, permits the shank to be withdrawn from the spindle.

I claim as my invention:

1. The combination of, a hollow rotary spindle having an outwardly opening recess in one end, a shank fitting into said recess and projecting beyond the end of said spindle to support a cutter, a hole in said spindle extending inwardly along the spindle axis while converging toward the axis with its inner end intersecting said recess short of the inner end thereof, an annular groove around the said shank short of the inner end thereof and in the plane of the inner end of said hole, said groove being defined by axially spaced and oppositely facing first and second walls, a rod journaled in and slidable along said hole, a head on the inner end of said rod having oppositely and axially facing annular end surfaces with arcuate side portions thereof projecting within said groove for abutment with said first and second walls, said end surfaces being axially spaced apart a distance somewhat less than said groove walls, and means coupling the outer ends of said rod and spindle and selectively operable to advance said rod and push one end surface of said head against said first wall to draw said shank inwardly or alternatively retract the rod to pull the other end surface of said head against said second wall and pull the shank outwardly relative to the spindle.

2. In a cutter shank tightener, the combination of, a hollow rotary spindle having an outwardly opening recess in one end, a shank fitting into said recess and projecting beyond the outer end of said spindle to support a cutter, an annular groove formed around the inner end portion of said shank and defining opposed inwardly and outwardly axially facing shoulders, an elongated hole in said spindle extending diagonally of the spindle axis with its inner end intersecting said recess adjacent said groove, a rod disposed in and slidable along said hole for engagement at its inner end against said outwardly facing shoulder, an annular groove formed around the inner end portion of said rod and defining an outwardly facing annular wall projecting into said groove in said shank for mating engagement with said inwardly facing shoulder, and means coupling said rod and said spindle and selectively operable to advance said rod inwardly and against said outwardly facing shoulder to draw said shank inwardly and clamp the same seated in said recess or alternatively retract said rod to engage said wall with said inwardly facing shoulder to pull the shank outwardly relative to the spindle.

3. The combination defined in claim 2 in which said outwardly facing shoulder constitutes the outer end surface of a head formed integrally on the inner end portion of said shank and having an inwardly and axially facing inner end surface, and further including a radially opening notch extending axially along the entire length of said head from said outer end surface to said inner end surface and opening axially out of each of said end surfaces.

4. The combination defined in claim 3 in which said wall constitutes the outer end surface of a head formed on said rod, said notch being larger than the head on said rod.

5. For supporting a cutter on and securing the same in the recess in the end of a rotary spindle, an elongated shank adapted to be telescoped in said recess, a head on the inner end of said shank and having an inwardly and axially facing inner end surface, an annular groove around the inner end portion of said shank short of said head and defining an outer and inwardly facing radial shoulder and an inner and outwardly facing radial shoulder, said latter shoulder constituting the outer end surface of said head, and a radially opening notch extending axially along the entire length of said head from said outer end surface to said inner end surface and opening axially out of each of said end surfaces.

6. The combination defined in claim 5 further including a peripheral flange formed on the outer end of said shank, and a locating recess in said flange in angular alinement with said notch.

References Cited by the Examiner

UNITED STATES PATENTS

| | | | |
|---|---|---|---|
| 1,475,257 | 11/1923 | Bottone | 279—97 X |
| 2,433,127 | 12/1947 | Kinzbach. | |
| 3,202,433 | 8/1965 | Davis | 279—77 X |

FOREIGN PATENTS 949,865    2/1964    Great Britain.

WILLIAM W. DYER, JR., *Primary Examiner.*

LEONIDAS VLACHOS, *Examiner.*